Jan. 10, 1950     T. K. RIGGEN     2,494,520
ELECTRONIC TIMER

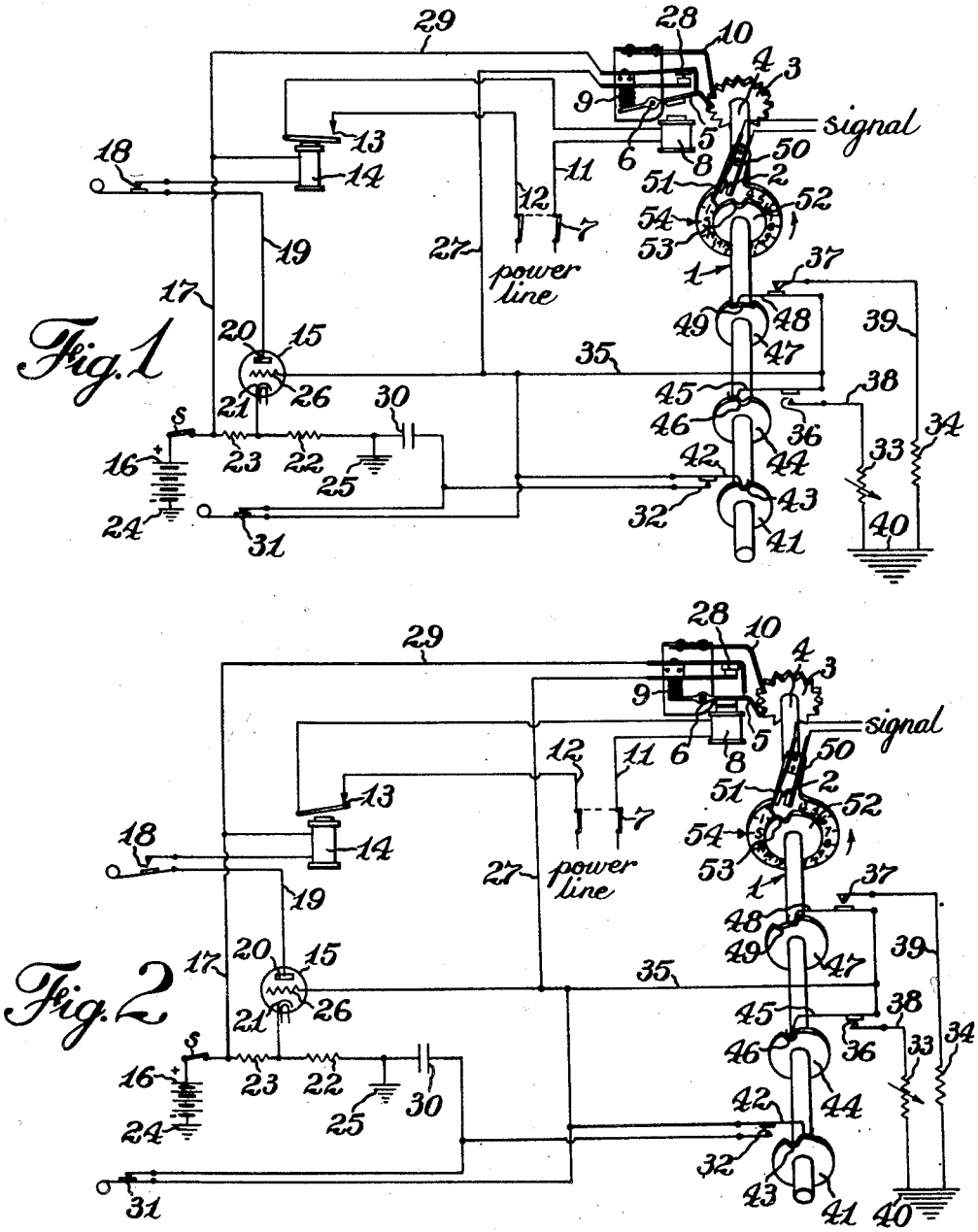

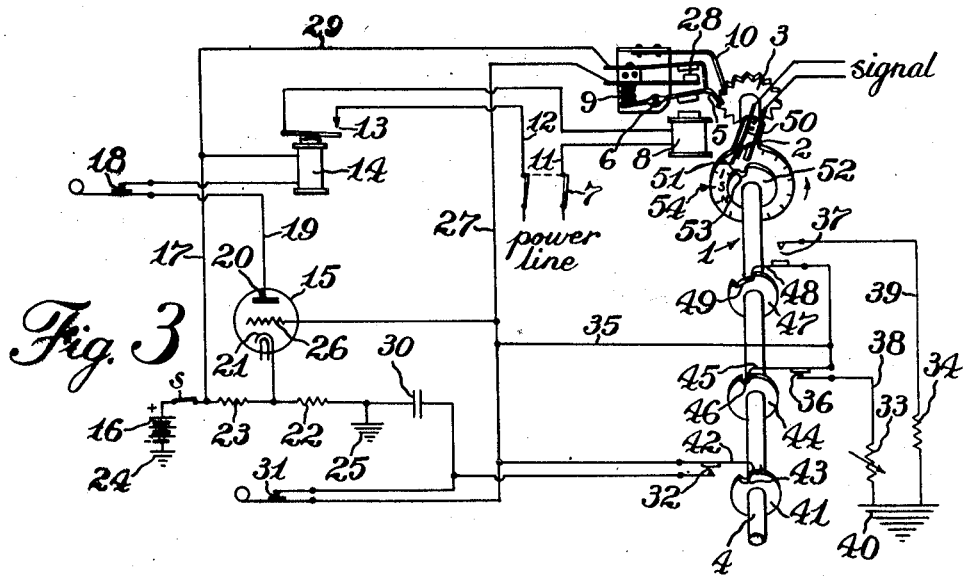
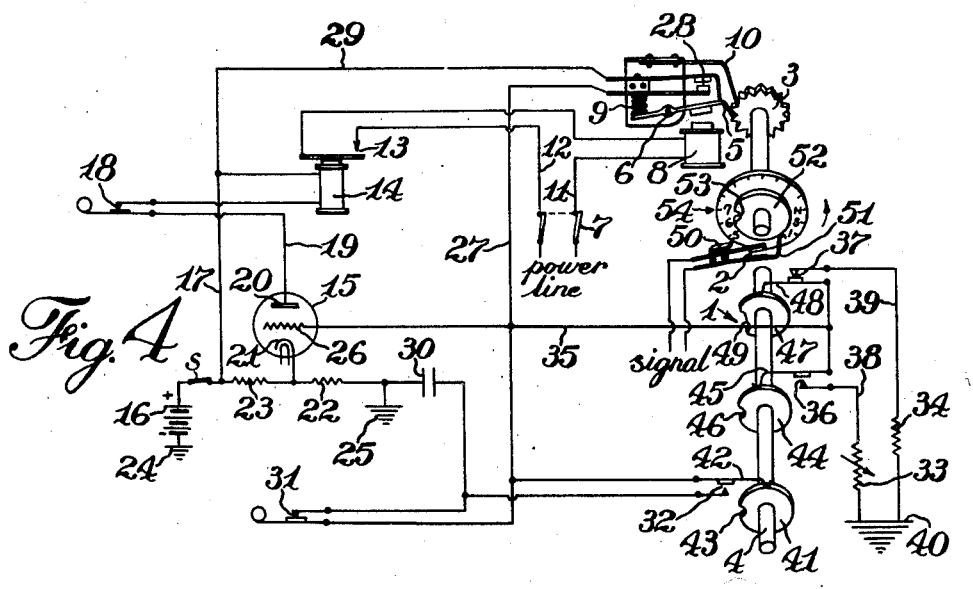
INVENTOR.
Theodore K. Riggen
BY
ATTORNEY

Filed Oct. 14, 1946     3 Sheets-Sheet 3

INVENTOR.
Theodore K. Riggen
BY
Clinton S. Janes
ATTORNEY

Patented Jan. 10, 1950

2,494,520

UNITED STATES PATENT OFFICE 2,494,520

ELECTRONIC TIMER

Theodore K. Riggen, Elmira, N. Y., assignor to Bendix Aviation Corporation, a corporation of Delaware Application October 14, 1946, Serial No. 703,221

11 Claims. (Cl. 175—320)

The present invention relates to an electronic timer and more particularly to a device for actuating a signal or performing any other desired function after a pre-selected time period.

Mechanisms of various kinds for indicating elapsed time periods have found commercial acceptance since the need for such devices in many arts is widespread. However, these devices have in general been subject to limitations which restrict their usefulness. Specifically, it has been difficult, if not impossible, to provide a device with sufficient latitude of adjustment, which retains its accuracy of operation percentagewise throughout the entire scope of its control. Moreover, most of such devices require resetting after each operation, which is inconvenient and makes it difficult to accurately measure succesive equal time periods. When such devices are employed to time photographic processes which are carried on in restricted illumination or in the dark, accurate resetting is rendered still more difficult.

It is an object of the present invention to provide a novel timing device which is accurate and reliable in operation while being simple and economical in construction.

It is another object to provide such device which has a wide latitude of adjustment while maintaining its accuracy substantially constant throughout its entire range of operation.

It is another object to provide such a device employing a setting means calibrated in equal increment of time such as minutes, and vernier setting means calibrated in shorter time intervals such as seconds.

It is another object to provide such a device which is adapted to repeat its operation indefinitely without the necessity of resetting the device unless it be desired to vary the selected time interval.

It is another object to provide such a device which may be conveniently operated in darkness.

It is another object to provide such a device which may be self contained and independent of any extraneous source of power.

It is another object to provide such a device in which there are few moving parts subject to frictional wear, the motion thereof is small and intermittent and the condition of the moving parts has no effect on the accuracy of the device.

Further objects and advantages will be apparent from the following description taken in connection with the accompanying drawing in which:

Fig. 1 is a semi-diagrammatic illustration of one form of electric timing device embodying the present invention, the mechanical controlling elements being shown in perspective for clarity; the parts being shown in position ready for operation and the timer being set to measure a period of less than one minute;

Fig. 2 is a similar view showing the parts in the positions assumed when the manual starting switch is opened to put the timing device in position to measure the time period;

Fig. 3 is a similar view showing the parts in the positions assumed when the manual starting switch is closed and the time period is elapsing;

Fig. 4 is a view similar to Fig. 3 showing the time device operating to measure a period of more than one minute;

Figure 5:
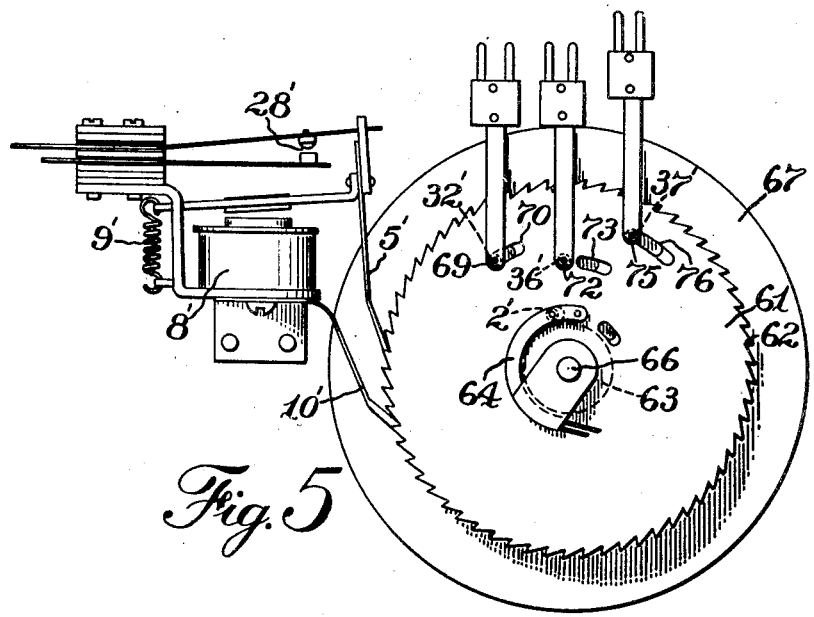
Fig. 5 is an enlarged detail in side elevation of a preferred form of automatic switching mechanism for use in timing device.

In Fig. 1 of the drawing, there is illustrated a timing device comprising a rotary switching means indicated generally by numeral 1 which is arranged, among other functions, to control a pair of contacts 2 which may operate a signal or perform any other function which is desired to occur after a measured time period.

Means for rotating the switch mechanism 1 step by step is provided comprising a ratchet wheel 3 fixed on a shaft 4 of the switching mechanism, and a pawl 5 pivoted at 6 in position to engage the teeth of the ratchet wheel. Pawl 5 is arranged to be actuated by an electromagnet 8 to rotate the wheel in a counterclockwise direction one tooth, and is retracted by a spring 9. A second pawl 10 prevents backward rotation of the ratchet wheel 3.

Means for energizing the electromagnet 8 is provided comprising leads 11 and 12 from any suitable source of electrical energy preferably controlled by a power switch 7; lead 11 being connected to one terminal of the electromagnet and lead 12 being connected to the other terminal through a pair of normally closed contacts 13 of a relay 14. Relay 14 is energized by the plate current from a thermionic tube 15. For that purpose a suitable source of plate voltage indicated as a battery 16 is connected through a battery switch S and a lead 17 to one terminal of the relay coil, and the opposite terminal is connected through a normally closed push-button starting switch 18 and lead 19 to the plate 25 of tube 15. The cathode 21 of the tube is connected to a voltage divider formed by resistances 22 and 23, the negative terminal of the battery being grounded at 24, and the voltage divider being grounded at 25.

Means for connecting the grid 26 of tube 15 to the positive terminal of the plate voltage supply 16 is provided comprising a lead 27, a pair of contacts 28 and a lead 29 connected to the battery lead 17. Contacts 28 are arranged to be controlled by the pawl 5, and are normally held open by the action of spring 9. When said pawl 5 is actuated by the energization of electromagnet 8 contacts 28 are allowed to close. When the grid 26 of tube 15 is made positive with respect to the cathode by closure of contacts 28 the tube is rendered conductive whereby relay 14 is energized to open contacts 13.

The grid circuit of tube 15 is arranged to be controlled by a time-delay circuit which is established for the purpose of measuring time intervals. This time-delay circuit comprises a condenser 30, one side of which is connected to the ground lead 25, while the other side is connected to the grid lead 27 through normally closed reset push button contacts 31 or through contacts 32 connected in parallel therewith. Condenser 30 is arranged to be discharged through either a variable resistor 33 or a fixed calibrated resistor 34; the relationship of said resistors to condenser 30 being such as to provide the desired measured time constants. In other words, the resistors 33 and 34 have such values as to discharge condenser 30 to a predetermined voltage in predetermined periods of time, the value of resistor 34 being such as to so discharge the condenser in a period of one minute, and the value of 33 being adjustable to control the discharge time in seconds. In order to obtain such controlled discharge of the condenser the grid lead 27 is connected by a lead 35 to a pair of normally closed contacts 36 and a pair of normally open contacts 37. Contacts 36 are connected by a lead 38 to the variable resistor 33 and contacts 37 are connected by a lead 39 to the fixed resistor 34. Resistors 33 and 34 are grounded at 40 to complete the discharging circuit for condenser 30.

The rotary switching means is arranged to control contacts 32, 36 and 37 as well as the signal contacts 2. The control of contacts 32 is effected by means of a cam wheel 41 fixed on shaft 4 in position to engage the end of contact arm 42 and hold contacts 32 open. A notch 43 is located in the periphery of the cam 41 in position to allow contacts 32 to close when the switch means is in the normal or idle position, as shown in Fig. 1.

Contacts 36 are controlled by a cam wheel 44 fixed on shaft 4 in position to cooperate with contact arm 45 to hold open said contacts. Cam 44 has a notch 46 in its periphery which is so located as to permit contacts 36 to close when the switching means is in the "ready" position as shown in Fig. 2.

Contacts 37 are controlled by a cam wheel 47 fixed on shaft 4 and cooperating with contact arm 48. Wheel 47 has a notch 49 in its periphery which extends across two adjacent positions of the switching means. Cam 47 is arranged to close the contacts 37, and the notch 49 is so located that said contacts are permitted to open when the switching means is in either its normal idling position or in the "ready" position adjacent thereto as shown in Figs. 1 and 2 respectively. The contacts are closed in all other positions of the cam 47 as shown in Fig. 4.

The signal contacts 2 are mounted on a holder 50 which is journalled on the shaft 4 in position for the contact arm 51 to cooperate with a cam wheel 52 fixed on said shaft. Cam wheel 52 normally holds signal contacts 2 open, and has a peripheral notch 53 which permits said contacts to close when the end of contact arm 51 is in registry therewith.

The contact holder 50 is provided with a scale reading N, S, 1, 2, 3, 4, etc., and a fixed index marker 54 is positioned adjacent the scale to show the rotary position of the holder. If the holder is positioned at the N or null position, the automatic control of the signal contacts is not used and the signal contacts will close when the operator opens the starting push button 18 as shown in Fig. 2. If the holder is positioned so that "S" or seconds on the scale is opposite the index as shown in Figs. 1 and 2, then notch 53 will register with the end of contact spring 51 when the switch means 1 has rotated two places from its normal position, or one step beyond the starting position shown in Fig. 2.

When the switching mechanism 1 is in its normal position as shown in Fig. 1, both sets of control contacts 36 and 37 are open and contacts 32 are closed. The condenser 30 is charged from a previous operation of the device, and since there is no connection from the grid of the tube to the ground, the condenser remains charged, the grid 26 of tube 15 is thus held positive and the tube is conductive whereby relay 14 is energized and holds contacts 13 open, thus keeping solenoid 8 deenergized.

If the operator desires to set the timing device to measure a period of seconds only, he will rotate the holder 50 so as to place the mark S opposite the index pointer as shown in Fig. 1 whereby rotation of the switching device 1 in the counterclockwise direction by two steps from its normal position will cause closure of the signal contacts 2. He will then adjust the variable resistor 33 by means of a suitably calibrated dial, to that resistance which will discharge the condenser 30 sufficiently to render the tube 15 non-conductive in the desired number of seconds. If it be desired to measure a period of minutes, the operator will adjust the resistor 33 to its zero position, and then rotate the holder 50 in a counterclockwise direction by as many steps as the number of minutes which it is desired to measure, the corresponding steps being numbered on the scale of the carrier.

In operation, starting with the parts in the positions shown in Fig. 1 with the instrument set to measure a period of seconds only, the operator closes the power switch 7 and battery switch S and puts the device in position to measure a time period by opening the push button contacts 18 as shown in Fig. 2. This deenergizes relay 14, allowing contacts 13 to close whereby solenoid 8 is energized, thus advancing the switching mechanism one step and closing contacts 28. The rotation of shaft 4 causes cam 41 to open contacts 32, and cam 44 to permit contacts 36 to close, whereby the seconds resistor 33 is connected to the grid circuit of the tube 15. Closure of contacts 28 connects grid 26 of the tube to the positive terminal of the battery 16, thereby fully charging the condenser 30.

The time period is started by the operator releasing the push button 18, allowing its contacts to close and cause relay 14 to open contacts 13, thus deenergizing the solenoid 8 and opening contacts 28 as shown in Fig. 3. Condenser 30 then discharges through the resistor 33 until the grid 26 of tube 15 becomes negative with respect to the cathode 21 which is kept at a suitable positive potential due to the voltage drop across resistor 22. When this occurs, the tube 15 becomes substantially non-conductive, relay 14 is deenergized, contacts 13 close and cause solenoid 8 to be energized whereby the switching mechanism is advanced another step, while the condenser 30 is recharged by closure of contacts 28.

Rotation of the switching device 1 to the second step closes contacts 2 which cause actuation of any preferred form of signal. It also opens contacts 36, disconnecting the seconds-resistor 33, and closes contacts 37 connecting the minutes resistor 34 to the grid circuit of the tube whereby the cycle of operation of the switch mechanism is repeated at intervals of one minute as determined by the discharge of condenser 30 through the minutes resistor 34. The cycling of the timing device continues after the closure of the signal contacts until the switch mechanism has made a complete revolution when it will be stopped in its normal position by the simultaneous opening of both the seconds contacts 36 and the minutes contacts 37 which leaves the condenser 30 charged ready for subsequent operation.

Means under the control of the operator for quickly rotating the disc to this normal position is provided in the form of reset push button contacts 31. These contacts are in parallel with contacts 32 and since contacts 32 are open except when the timing device is in normal position manual opening of contacts 31 isolates the condenser 30 from the grid circuit of the tube 15 so that the time delay provided by the discharge of the condenser is removed. The cycling of the device will then proceed rapidly until the rotary switch means returns to its normal position whereupon contacts 32 close, thus connecting the condenser 30 to the grid circuit of the tube and at the same time the resistors 33 and 34 are disconnected as above set forth so that the condenser remains charged, maintaining the grid of the tube positive, and the consequent flow of plate current through the tube 15 holds the relay 14 energized as previously described.

Figure 6:
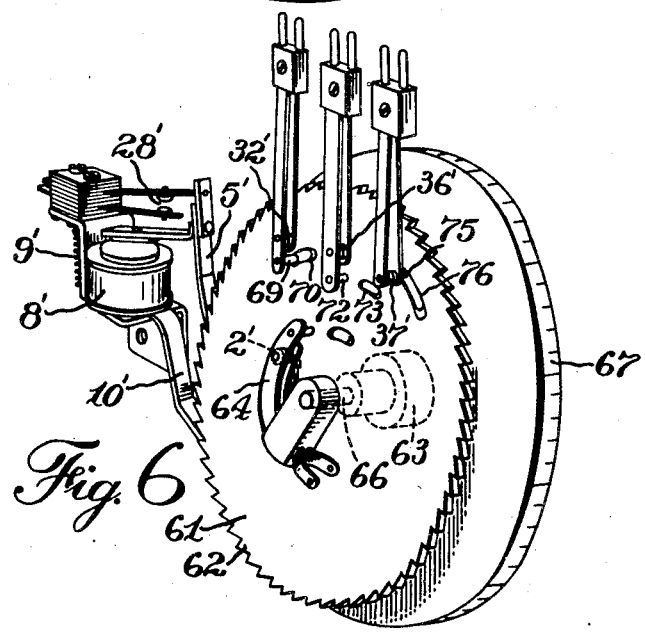
Fig. 6 is a perspective view of the switching mechanism as shown in Fig. 5.

In Figs. 5 and 6 of the drawing there is illustrated a rotary switching means in which all four sets of contacts are controlled by a single ratchet wheel. As there shown disc 61 having a plurality of peripheral teeth 62, corresponding in number to the maximum desired time interval in minutes, is journalled on a fixed bearing member 63. A holder 64 for signal contacts 2' is mounted on a shaft 66 which is journalled within the bearing 63 and is rotatable by suitable means such as a manually operable dial 67. Stop contacts 32' are fixedly mounted adjacent the side of the disc 61 and are arranged to be held open by engagement of a pin 69 with the side of the disc except when the pin registers with an opening 70 in the disc. Seconds contacts 36' are similarly held open by a pin 72 except when said pin registers with an opening 73 in the disc. Minutes contacts 37' are arranged to be held closed by engagement of a pin 75 with the disc 61 except when said pin registers with an opening 76 in the disc which opening is arcuate and extends through an angular distance equal to two of the teeth 62 of the disc.

Means for rotating the disc is here shown in the form of an electromagnet 8' arranged to actuate a pawl 5' engaging in the teeth 62 of the disc. Contacts 28' are arranged to be controlled by the pawl 5', and a spring 9' normally holds the pawl raised and contacts 28' open. A spring pawl 10' prevents backward rotation of the disc 61. It will be understood that this switching mechanism is to be substituted for the switching mechanism 1 of Figs. 1 to 4, the corresponding parts being indicated by primed numerals.

In Fig. 6 the disc 61 is shown in its normal or idle position corresponding to the positions of the parts in Fig. 1, that is, contacts 32' are closed since the pin 69 is in registry with its opening 70, seconds contacts 36' are open since the pin 72 is not in registry with opening 73, and minutes contacts 37' are open since pin 75 is located in one end of the arcuate opening 76 of the disc. If now the electromagnet 8' is energized by manipulation of the starting button 18 (Fig. 1) by the operator, the pawl 5' advances the disc 61 one tooth thereby causing the pin 69 to be cammed out of the opening 70 by the inclined side of said opening, thus breaking contacts 32'. At the same time seconds contacts 36' are closed by the entry of the pin 72 into registry with the opening 73 of the disc, and minutes contacts 37' remain open since the pin 75 merely traverses the arcuate opening 76 without being cammed out.

After the lapse of the time interval in seconds determined by the setting of the variable resistor 33, the electromagnet 8' will be reenergized thus causing the disc to be rotated another step which causes opening of the seconds contacts 36' and closure of minutes contacts 37' by the camming out of respective pins 72 and 75 by the inclined sides of openings 73 and 76 respectively. If the signal contacts 2' are set as illustrated so as to close at this time, the signal will be actuated after the first time interval. However, if a period of minutes is desired the signal contacts will be rotated by the dial 67 to a position corresponding to the desired number of minutes and the signal will be actuated when the device has cycled until the selected number of minutes has elapsed.

Although certain structures have been shown and described in detail, it is understood that various changes may be made in the design and arrangement of the parts without departing from the spirit of the invention as defined in claims appended hereto.

What is claimed is:

1. In an electronic timer a signal controlling device, actuating means therefor, means including a relay which when energized prevents the energization of the actuating means, and means for controlling the energization of the relay including an electrical circuit having a condenser and a resistor in series, means for charging the condenser and means whereby discharge of the condenser through the resistor causes deenergization of the relay.

2. An electronic timer as set forth in claim 1 in which the controlling means for the relay includes a thermionic tube, the plate current from which is used to energize the relay, and the grid bias of which is controlled by the voltage across said condenser.

3. An electronic timer as set forth in claim 1 including further, means for repeating the charging and discharging cycle of the condenser-resistor circuit, and means for actuating the signal controlling device after a pre-determined number of such cycles.

4. In a timing device manually variable means for measuring a time interval, fixed calibrated means for measuring a time interval, means for initially activating the first measuring means and thereafter repeatedly activating the second measuring means, and preset means for performing a desired function after a predetermined number of operations of the activating means.

5. A timing device as set forth in claim 4 in which the measuring means comprises an electrical circuit having a condenser and a resistor connected to discharge the condenser to a predetermined voltage in the desired time interval.

6. A timing device as set forth in claim 4 including manually operable means for initiating the operation of the device and means for returning the device to starting position without changing its setting.

7. In an electronic timing device rotary switching means, step by step rotating means therefor including a solenoid, means for energizing the solenoid including a magnetic relay, means for energizing the relay including a thermionic tube having a cathode, a plate and a control grid, a circuit including a source of voltage, the cathode, plate and relay; a circuit controlling the grid including a condenser, means for so charging the condenser as to put positive bias on the grid, calibrated means for discharging the condenser in a predetermined time to a voltage such that the plate current of the tube is insufficient to actuate the relay, and means whereby the consequent release of the relay causes actuation of the solenoid.

8. An electronic timing device as set forth in claim 7 in which the means for charging the condenser includes contacts controlled by the solenoid to recharge the condenser after each actuation of the solenoid.

9. An electronic timing device as set forth in claim 7 in which the grid circuit of the tube is initially open and the first rotative step of the switching means closes said circuit through the calibrated discharging means; and manual means for opening the plate circuit of the tube to deenergize the relay and thereby initiate actuation of the solenoid.

10. In a timing mechanism a signal controlling device, movable means for actuating said device, step by step advancing means for the movable means and means for controlling the advancing means including an electrical circuit having a condenser and resister in series, the time constant of the circuit controlling the interval between successive steps of the advancing means, including further, means for substituting a second resistor in said circuit at the end of the first interval.

11. In a timing mechanism a signal controlling device, movable means for actuating said device, step by step advancing means for the movable means and means for controlling the advancing means including an electrical circuit having a condenser and resister in series, the time constant of the circuit controlling the interval between successive steps of the advancing means, including further, means for substituting a second resistor in said circuit at the end of the first time interval, and manually adjustable means for causing a predetermined number of cycles of operation of the advancing means to occur prior to actuation of the signal controlling device.

THEODORE K. RIGGEN.

REFERENCES CITED

The following references are of record in the file of this patent:

UNITED STATES PATENTS

| Number | Name | Date |
| --- | --- | --- |
| 1,552,321 | Lea | Sept. 1, 1925 |
| 2,061,011 | Vingerhoets | Nov. 17, 1936 |
| 2,233,533 | James | Mar. 4, 1941 |
| 2,379,262 | Terry | June 26, 1945 |